(12) United States Patent
Cho et al.

(10) Patent No.: US 9,140,944 B2
(45) Date of Patent: Sep. 22, 2015

(54) NANOCRYSTAL DISPLAY INCLUDING BLACK MATRIX BETWEEN COMMON ELECTRODE AND DATA LINE IN BOUNDARY BETWEEN PIXEL AREAS

(71) Applicant: Samsung Display Co., Ltd., Yongin, Gyeonggi-Do (KR)

(72) Inventors: Se Hyoung Cho, Seoul (KR); Meehye Jung, Suwon-si (KR); Sunhwa Lee, Andong-si (KR); Sunghwan Won, Seoul (KR); Chongchul Chai, Seoul (KR)

(73) Assignee: SAMSUNG DISPLAY CO., LTD. (KR)

( * ) Notice: Subject to any disclaimer, the term of this patent is extended or adjusted under 35 U.S.C. 154(b) by 207 days.

(21) Appl. No.: 13/772,758

(22) Filed: Feb. 21, 2013

(65) Prior Publication Data

US 2014/0104532 A1   Apr. 17, 2014

(30) Foreign Application Priority Data

Oct. 16, 2012   (KR) .......................... 10-2012-0115020

(51) Int. Cl.
| | |
|---|---|
| *G02F 1/1333* | (2006.01) |
| *G02F 1/1343* | (2006.01) |
| *G02F 1/1362* | (2006.01) |
| *G02F 1/1368* | (2006.01) |
| *G02F 1/1335* | (2006.01) |
| *G02F 1/1337* | (2006.01) |
| *G02F 1/139* | (2006.01) |

(52) U.S. Cl.
CPC ............ *G02F 1/1362* (2013.01); *G02F 1/1368* (2013.01); *G02F 1/133377* (2013.01); *G02F 1/133512* (2013.01); *G02F 1/1393* (2013.01); *G02F 1/133707* (2013.01); *G02F 1/136209* (2013.01); *G02F 2001/134345* (2013.01)

(58) Field of Classification Search
CPC .................... G02F 1/133512; G02F 1/136209; G02F 2001/134345
USPC ................................................... 349/110, 144
See application file for complete search history.

(56) References Cited

U.S. PATENT DOCUMENTS

| | | | |
|---|---|---|---|
| 8,169,569 B2 | 5/2012 | Kang et al. | |
| 8,390,753 B2 * | 3/2013 | Choi ............................... 349/43 |
| 2010/0051951 A1 | 3/2010 | Lee et al. | |

(Continued)

FOREIGN PATENT DOCUMENTS

| | | |
|---|---|---|
| JP | 2010-055065 A | 3/2010 |
| KR | 1020070060243 A | 6/2007 |
| KR | 1020110021586 A | 3/2011 |

*Primary Examiner* — Paisley L Arendt
(74) *Attorney, Agent, or Firm* — Cantor Colburn LLP (57) ABSTRACT

A nanocrystal display device includes a plurality of pixels; a gate line extended in a row direction; a data line extended in a column direction; and a second insulating layer on the data line. Each pixel includes first and second pixel areas adjacent to each other in the column direction; first and second pixel electrodes on the second insulating layer of the first and second pixel areas; a first black matrix on the second insulating layer, and having a step difference greater than that of the first and second pixel electrodes; a common electrode extended in the row direction, contacting the first black matrix and spaced apart from the second insulating layer in the first and second pixel areas, and a tunnel-shaped cavity between the common electrode, the first black matrix and the second insulating layer; and a liquid crystal layer in the tunnel-shaped cavity.

18 Claims, 8 Drawing Sheets

(56) References Cited

U.S. PATENT DOCUMENTS

| | | |
|---|---|---|
| 2010/0053507 A1* | 3/2010 | Song et al. ................. 349/84 |
| 2010/0149464 A1 | 6/2010 | Han et al. |
| 2011/0049519 A1 | 3/2011 | Kim et al. |
| 2011/0085103 A1 | 4/2011 | Yang et al. |
| 2011/0242468 A1 | 10/2011 | Choi et al. |
| 2011/0310075 A1* | 12/2011 | Goh et al. ................. 345/211 |
| 2012/0062448 A1* | 3/2012 | Kim et al. ................. 345/55 |
| 2012/0086895 A1 | 4/2012 | Lee et al. |
| 2012/0120334 A1* | 5/2012 | Lee et al. ................. 349/33 |

* cited by examiner

NANOCRYSTAL DISPLAY INCLUDING BLACK MATRIX BETWEEN COMMON ELECTRODE AND DATA LINE IN BOUNDARY BETWEEN PIXEL AREAS

This application claims priority to Korean Patent Application No. 10-2012-0115020, filed on Oct. 16, 2012, and all the benefits accruing therefrom under 35 U.S.C. §119, the contents of which are hereby incorporated by reference.

BACKGROUND

1. Field

The invention relates to a nanocrystal display. More particularly, the invention relates to a nanocrystal display capable of preventing delay of a data signal and stabilizing an arrangement of liquid crystal molecules.

2. Description of the Related Art

Various display devices, such as a liquid crystal display device, an organic light emitting diode display, an electrowetting display device, an electrophoretic display device, a nanocrystal display device, etc., have been developed. In general, a display device includes a plurality of pixels to display an image. The pixels receive data signals in response to gate signals, and display gray scales corresponding to the data signals.

Among the display devices, the liquid crystal display device has a relatively narrower viewing angle when compare to the other display devices. To improve the viewing angle of the liquid crystal display device, various driving modes, e.g., a patterned vertical alignment ("PVA") mode, a multi-domain vertical alignment ("MVA") mode, a super-patterned vertical alignment ("S-PVA") mode, etc., have been researched and developed. Among them, each pixel of the S-PVA mode liquid crystal display device includes two sub-pixels applied with different data voltages from each other. Human eyes recognize an intermediate value between the two different data voltages. Accordingly, distortion of a gamma curve is reduced or effectively prevented under an intermediate gray scale, so that a side visibility of the liquid crystal display device is improved.

In general, the liquid crystal display device includes two substrates, and a liquid crystal layer interposed between the two substrates. The two substrates are spaced apart from each other to accommodate the liquid crystal layer therebetween, and a distance between the two substrates is maintained by a spacer. The spacer is formed on one of the two substrates when the liquid crystal display device is manufactured, and the other one of the two substrates is adhered to the spacer. As a result, a manufacturing process of the liquid crystal display device is complex and a manufacturing cost of the liquid crystal display device is increased.

SUMMARY

One or more exemplary embodiment of the invention provides a nanocrystal display capable of preventing delay of a data signal and stabilizing an arrangement of liquid crystal molecules.

Exemplary embodiments of the invention provide a nanocrystal display device including a substrate including a plurality of pixels which displays an image, a gate line on the substrate and extended in a pixel row direction, a first insulating layer on the substrate to cover the gate line, a data line on the first insulating layer, extended in a pixel column direction and crossing the gate line, and a second insulating layer on the data line. Each pixel includes a first pixel area and a second pixel area adjacent to each other in the pixel column direction, a first sub-pixel including a first pixel electrode on the second insulating layer of the first pixel area, a second sub-pixel including a second pixel electrode on the second insulating layer of the second pixel area, a first black matrix on the second insulating layer and having a step difference greater than a step difference of the first and second pixel electrodes, a common electrode extended in the pixel row direction, contacting the first black matrix and spaced apart from the second insulating layer in the first and second pixel areas, a tunnel-shaped cavity between the common electrode, the first black matrix and the second insulating layer, and a liquid crystal layer in the tunnel-shaped cavity.

The nanocrystal display device may further include a first boundary area extended in the pixel row direction and between the adjacent first and second pixel areas, and a second boundary area extended in the pixel column direction, between adjacent first pixel areas and between adjacent second pixel areas. The first black matrix may be on the second insulating layer in the second boundary area except for an area in which the first boundary area crosses the second boundary area.

The nanocrystal display device may further include first and second storage lines extended in the pixel row direction and in a same layer as the gate line, and the each pixel is connected to the gate line and the data line.

The first sub-pixel may further include a first thin film transistor connected to the gate line, the data line and the first pixel electrode, the second sub-pixel may further include a second thin film transistor connected to the gate line, the data line and the second pixel electrode, and a third thin film transistor connected to the gate line and the second pixel electrode. The first, second, and third thin film transistors are in the first boundary area.

The second insulating layer in the first boundary area may cover the first, second, and third thin film transistors.

The second insulating layer in the first boundary may include a plurality of protrusions, and a plurality of recesses respectively between the protrusions, the protrusions and recesses extended in the pixel column direction.

The nanocrystal display device may further include a first contact hole defined in a portion of the second insulating layer at a first recess and a second contact hole defined in a portion of the second insulating layer at a second recess different than the first recess.

The first thin film transistor may include a first source electrode branched from the data line, a first gate electrode branched from the gate line, and a first drain electrode connected to the first pixel electrode through the first contact hole.

The second thin film transistor may include a second source electrode branched from the data line, a second gate electrode branched from the gate line, and a second drain electrode connected to the second pixel electrode through the second contact hole.

The nanocrystal display device may further include a second black matrix in the recesses of the first boundary area.

The nanocrystal display device may further include first and second branch electrodes branched from the first storage line and extended in the pixel column direction while being spaced apart from each other in the pixel row direction, and third and fourth branch electrodes branched from the second storage line and extended in the pixel column direction while being spaced apart from each other in the pixel row direction.

The third thin film transistor may include a third gate electrode branched from the gate line, a third drain electrode connected to the second pixel electrode, and a third source electrode connected to one of the first and second branch electrodes.

The first pixel electrode may partially overlap the first storage line and the first and second branch electrodes and the second pixel electrode may partially overlap the second storage line and the third and fourth branch electrodes.

The nanocrystal display device may further include a protective layer covering the first, second and third thin film transistors of the first boundary area, a first contact hole defined in the protective layer, and a second contact hole defined in the protective layer.

The first thin film transistor may be connected to the first pixel electrode through the first contact hole and the second thin film transistor may be connected to the second pixel electrode through the second contact hole.

The first black matrix may contact the protective layer of the first boundary area, and an end of the second insulating layer overlaps an end of the first black matrix in the first boundary area.

According to one or more exemplary embodiments of the invention, the nanocrystal display device may reduce or effectively prevent delay of a data signal applied to the data line, and stabilize arrangement of liquid crystal molecules of the liquid crystal layer.

BRIEF DESCRIPTION OF THE DRAWINGS

The above and other advantages of the invention will become readily apparent by reference to the following detailed description when considered in conjunction with the accompanying drawings wherein.

DETAILED DESCRIPTION

It will be understood that when an element or layer is referred to as being "on," or "connected to" another element or layer, it can be directly on or connected to the other element or layer or intervening elements or layers may be present. In contrast, when an element is referred to as being "directly on" or "directly connected to" another element or layer, there are no intervening elements or layers present. As used herein, connected may refer to elements being physically and/or electrically connected to each other. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "lower" other elements or features would then be oriented "upper" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a," "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be explained in detail with reference to the accompanying drawings.

Figure 1:
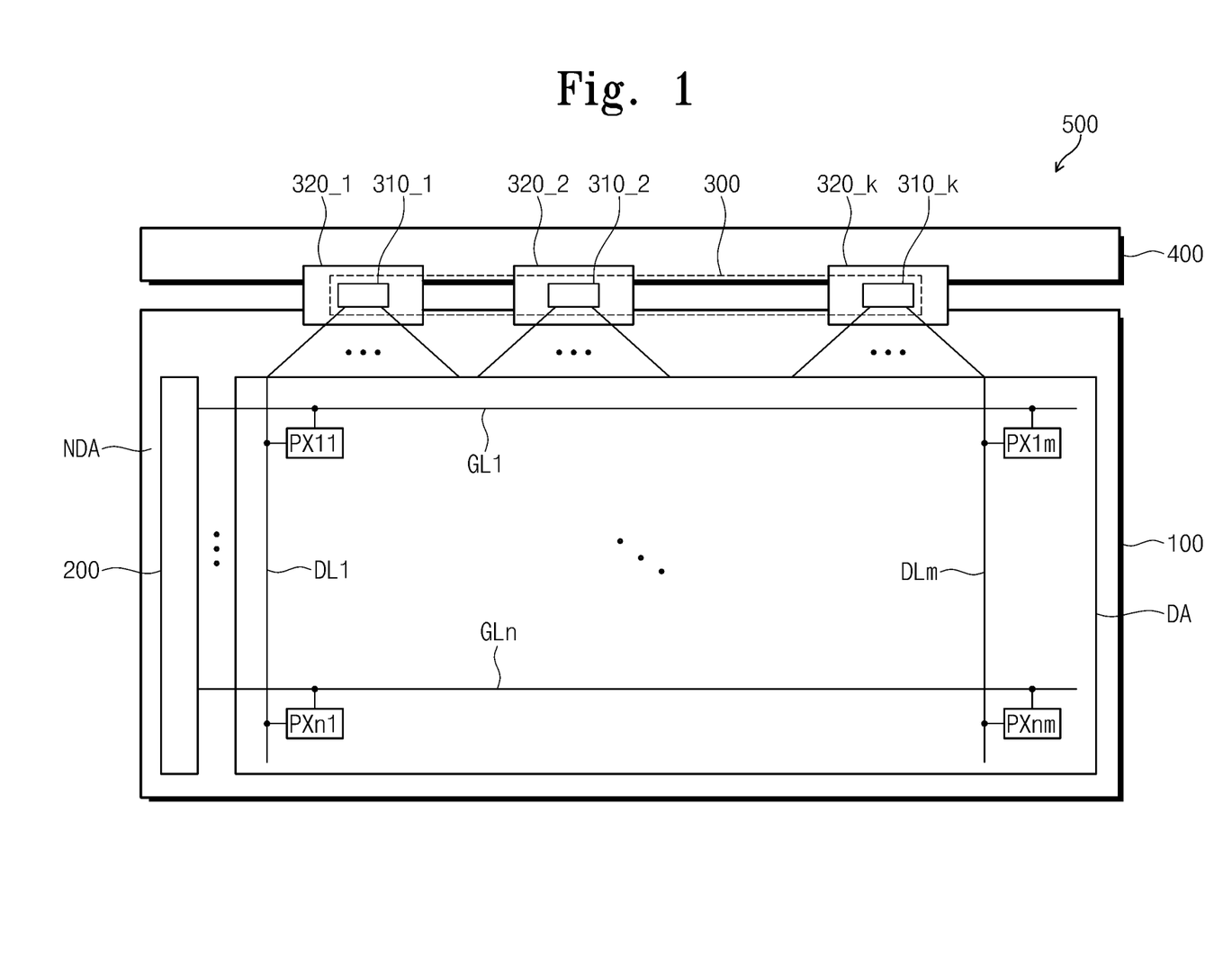
FIG. 1 is a plan view showing an exemplary embodiment of a nanocrystal display according to the invention.

FIG. 1 is a plan view showing an exemplary embodiment of a nanocrystal display according to the disclosure.

Referring to FIG. 1, a nanocrystal display device 500 includes a display panel 100, a gate driver 200, a data driver 300 and a driving circuit substrate 400.

The display panel 100 includes a display area DA in which a plurality of pixels PX11 to PXnm are arranged in a matrix form, a non-display area NDA surrounding and excluding the display area DA, a plurality of gate lines GL1 to GLn, and a plurality of data lines DL1 to DLm insulated from the gate lines GL1 to GLn while crossing the gate lines GL1 to GLn.

The gate lines GL1 to GLn are connected to the gate driver 200 to sequentially receive gate signals from the gate driver 200. The data lines DL1 to DLm are connected to the data driver 300 to receive data voltages in analog form, from the data driver 300.

Each of the pixels PX11 to PXnm is connected to a corresponding gate line of the gate lines GL1 to GLn and a corresponding data line of the data lines DL1 to DLm. In the illustrated exemplary embodiment, the pixels PX11 to PXnm are arranged in areas defined in association with the gate lines GL1 to GLn and the data lines DL1 to DLm, but the invention is not limited thereto or thereby. Accordingly, the pixels PX11 to PXnm are arranged in "n" rows by "m" columns. Each of the "m" and the "n" is an integer number greater than zero (0).

Each of the pixels PX11 to PXnm receives a corresponding data voltage of the data voltages through the corresponding data line in response to a corresponding gate signal of the gate signals provided through the corresponding gate line. As a result, each of the pixels PX11 to PXnm displays a gray scale corresponding to the corresponding data voltage.

The gate driver 200 is disposed in the non-display area NDA adjacent to a side of the display area DA. In the illustrated exemplary embodiment, the gate driver 200 is mounted in a portion of the non-display area NDA adjacent to a left side of the display area DA in an amorphous silicon thin film transistor ("TFT") gate driver circuit ("ASG") form. The gate driver 200 generates the gate signals in response to a gate control signal provided from a timing controller (not shown) mounted on the driving circuit substrate 400. The gate signals generated by the gate driver 200 are sequentially applied to pixels PX11 to PXnm through the gate lines GL1 to GLn in units of a row, that is, in a row-by-row basis. Thus, the pixels PX11 to PXnm are driven in units of pixel rows.

The data driver 300 receives image signals and a data control signal from the timing controller. The data driver 300 generates analog data voltages corresponding to the image signals in response to the data control signal. The data driver 300 applies the data voltages to the pixels PX11 to PXnm through the data lines DL1 to DLm. The data driver 300 includes a plurality of source driver chips 310_1 to 310_k. The "k" is an integer number greater than zero and smaller than "m." The source driving chips 310_1 to 310_k are respectively mounted on flexible printed circuit boards 320_1 to 320_k and are connected between the driving circuit substrate 400 and a portion of the non-display area NDA adjacent to an upper side of the display area DA.

In the exemplary embodiment, the source driving chips 310_1 to 310_k are mounted on the flexible printed circuit boards 320_1 to 320_k in a tape carrier package ("TCP") method, but are not limited thereto or thereby. That is, the source driving chips 310_1 to 310_k may be mounted on the portion of the non-display area NDA adjacent to the upper side of the display area DA in a chip-on-glass ("COG") method.

Figure 2:
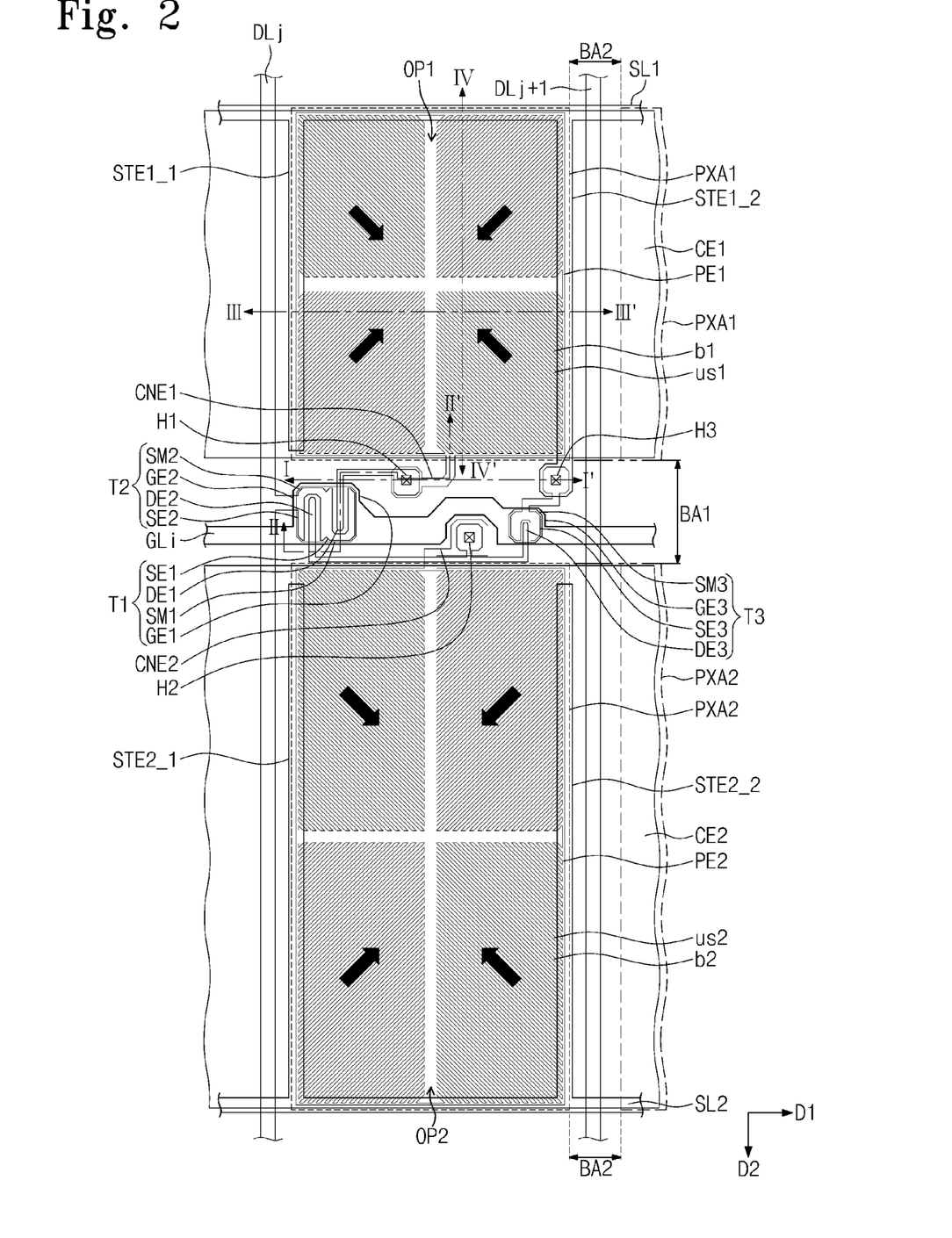
FIG. 2 is a plan view showing an exemplary embodiment of a pixel shown in FIG. 1.

FIG. 2 is a plan view showing an exemplary embodiment of a pixel shown in FIG. 1.

In the illustrated exemplary embodiment, the pixels PX11 to PXnm have the same configuration and function, and thus, for the convenience of explanation, one pixel PXij will be described in detail with reference to FIG. 2.

Referring to FIG. 2, the pixel PXij is connected to the corresponding gate line GLi and the corresponding data line DLj. The longitudinal axis of the gate line GLi is extended in a first direction D1, and the longitudinal axis of the data line DLj is extended in a second direction D2 crossing the first direction D1. The first direction D1 corresponds to a pixel row direction and the second direction D2 corresponds to a pixel column direction.

The pixel PXij includes a first sub-pixel and a second sub-pixel. The first sub-pixel includes a first thin film transistor T1, a first pixel electrode PE1 and a first storage electrode part. The second sub-pixel includes a second thin film transistor T2, a second pixel electrode PE2, a second storage electrode part and a third thin film transistor T3.

An area of the first sub-pixel, in which the image is displayed, is referred to as a first pixel area PXA1, and area of the second sub-pixel, in which the image is displayed, is referred to as a second pixel PXA2. The first pixel electrode PE1 is disposed in the first pixel area PXA1 and the second pixel electrode PE2 is disposed in the second pixel area PXA2.

An area having a longitudinal axis which is extended in the pixel row direction and includes a boundary area between the first and second pixel areas PXA1 and PXA2 is referred to as a first boundary area BA1. The gate line GLi and first to third thin film transistors T1 to T3 are disposed in the first boundary area BA1.

An area having a longitudinal axis which is extended in the pixel column direction and includes a boundary area between adjacent first pixel areas PXA1 and between adjacent second pixel areas PXA2 is referred to as a second boundary area BA2. For the convenience of explanation, a portion of an adjacent first pixel area PXA1 to a right side of the first pixel area PXA1 and a portion of an adjacent second pixel area PXA2 to a right side of the second pixel area PXA2 have been shown in FIG. 2. The data lines DLj and DLj+1 are disposed in the second boundary area BA2.

The first boundary area BA1 crosses the second boundary area BA2 in the plan view. The gate line GLi crosses the data line DLj in a cross area at which the first and second boundary areas BA1 and BA2 cross each other.

Although not shown in FIG. 2, an area between adjacent pixel rows each is referred to as a third boundary area BA3. In one exemplary embodiment, for instance, among two pixels adjacent to each other in the pixel column direction, the area between the second pixel area PXA2 of an upper pixel of the two pixels and the first pixel area PXA1 of a lower pixel of the two pixels is referred to as the third boundary area BA3. The longitudinal axis of the third boundary area BA3 is extended in the first direction D1 as shown in FIG. 2.

The first thin film transistor T1 of the first sub-pixel includes a first gate electrode GE1 branched from the gate line GLi, a first source electrode SE1 branched from the data line DLj, a first drain electrode DE1 connected to the first pixel electrode PE1, and a first semiconductor layer SM1. The first drain electrode DE1 is electrically connected to a first connection electrode CNE1 branched from the first pixel electrode PE1, through a first contact hole H1.

The first storage electrode part includes a first storage line SL1 extended in the first direction D1, a first branch electrode STE1_1 branched from the first storage line SL1 and extended in the second direction D2, and a second branch electrode STE1_2 branched from the first storage line SL1 and extended in the second direction D2 while being spaced apart from the first branch electrode STE1_1 in the first direction D1. The first pixel electrode PE1 is partially overlapped with the first storage line SL1 and the first and second branch electrodes STE1_1 and STE1_2 to form a first storage capacitor. The first storage electrode part receives a storage voltage.

The second thin film transistor T2 of the second sub-pixel includes a second gate electrode GE2 branched from the gate line GLi, a second source electrode SE2 branched from the data line DLj, a second drain electrode DE2 connected to the second pixel electrode PE2, and a second semiconductor layer SM2. The second drain electrode DE2 is electrically connected to a second connection electrode CNE2 branched from the second pixel electrode PE2, through a second contact hole H2.

The third thin film transistor T3 of the second sub-pixel includes a third gate electrode GE3 branched from the gate line GLi, a third source electrode SE3 electrically connected to the second branch electrode STE1_2 through a third contact hole H3, a third drain electrode DE3 extended from the second drain electrode DE2, and a third semiconductor layer SM3. The third source electrode SE3 and the second branch electrode STE1_2 are electrically connected to each other through the third contact hole H3. The third drain electrode DE3 is electrically connected to the second pixel electrode PE2 through the second contact hole H2.

The second storage electrode part includes a second storage line SL2 extended in the first direction D1, a third branch electrode STE2_1 branched from the second storage line SL2 and extended in a direction opposite to the second direction D2, and a fourth branch electrode STE2_1 branched from the second storage line SL2 and extended in the direction opposite to the second direction D2 while being spaced apart from the third branch electrode STE2_1 in the first direction D1. The second pixel electrode PE2 is partially overlapped with the second storage line SL2 and the third and fourth branch electrodes STE2_1 and STE2_2 to form a second storage capacitor. The second storage electrode part receives the storage voltage.

The first thin film transistor T1 may have the same size as that of the second thin film transistor T2. The third thin film transistor T3 may have the size smaller than that of the second thin film transistor T2. The "size" may refer to as a planar area occupied by the thin film transistor.

The first pixel electrode PE1 includes a first open area OP1 defined therein and having a cross shape in the plan view, and a plurality of first branches b1 extended to the first open area OP1 from an outer portion of the first pixel electrode PE1. The cross-shaped first open area OP1 may be defined by distal ends of the plurality of first branches b1. A material of the first pixel electrode PE1 is not in the first open area OP1. The first pixel area PXA1 is divided into four domains by the first open area OP1. The first branches b1 are extended from the outer portion of the first pixel electrode PE1, in different directions according to the domains. The first branches b1 are extended substantially in parallel to each other and spaced apart from each other in each domain. Among the first branches b1, adjacent first branches b1 are spaced apart from each other at a distance of micrometers so as to form a plurality of first fine slits us1 between the spaced apart first branches b1.

The second pixel electrode PE2 has the same structure as the first pixel electrode PE1. That is, the second pixel electrode PE2 includes a second open area OP2 defined therein and having a cross shape in the plan view, and a plurality of second branches b2 extended to the second open area OP2 from an outer portion of the second pixel electrode PE2. The cross-shaped second open area OP2 may be defined by distal ends of the plurality of second branches b2. Among the second branches b2, adjacent second branches b2 are spaced apart from each other at a distance of micrometers so as to form a plurality of first fine slits us2 between the spaced apart second branches b2.

The first and second pixel electrodes PE1 and PE2 include a transparent conductive material, e.g., indium tin oxide ("ITO"), indium zinc oxide ("IZO"), indium tin zinc oxide ("ITZO"), etc.

The longitudinal axes of first and second common electrodes CE1 and CE2 are extended in the pixel row direction. The first common electrode CE1 is overlapped with the first pixel areas PXA1 which are arranged in the pixel row direction. The second common electrode CE2 is overlapped with the second pixel areas PXA2 which are arranged in the pixel row direction. A common voltage is applied to the first and second common electrodes CE1 and CE2.

The first and second common electrodes CE1 and CE2 include the transparent conductive material, such as ITO, IZO, ITZO, etc.

Although not shown in FIG. 2, a liquid crystal layer is disposed between the first common electrode CE1 overlapped with the first pixel area PXA1 and the first pixel electrode PE1, and between the second common electrode CE2 overlapped with the second pixel area PXA2 and the second pixel electrode PE2. The liquid crystal layer will be described with reference to FIGS. 5 and 6.

Due to the first fine slits us1 of the first pixel electrode PE1, liquid crystal molecules of the liquid crystal layer in the first pixel area PXA1 are pretilted in different directions from each other according to the domains of the first pixel area PXA1. In one exemplary embodiment, for instance, directions in which the liquid crystal molecules are inclined are four directions toward the first open area OP1, as shown by arrows in FIG. 2. Thus, four domains in which the liquid crystal molecules are arranged in different directions, are formed in the liquid crystal layer. As described above, when the directions in which the liquid crystal molecules are inclined are various, a reference viewing angle of a nanocrystal display becomes large. Directions in which the liquid crystal molecules of the liquid crystal layer in the second pixel area PXA2 are inclined are substantially the same as the directions in which the liquid crystal molecules of the liquid crystal layer in the first pixel area PXA1 are inclined.

Figure 3:
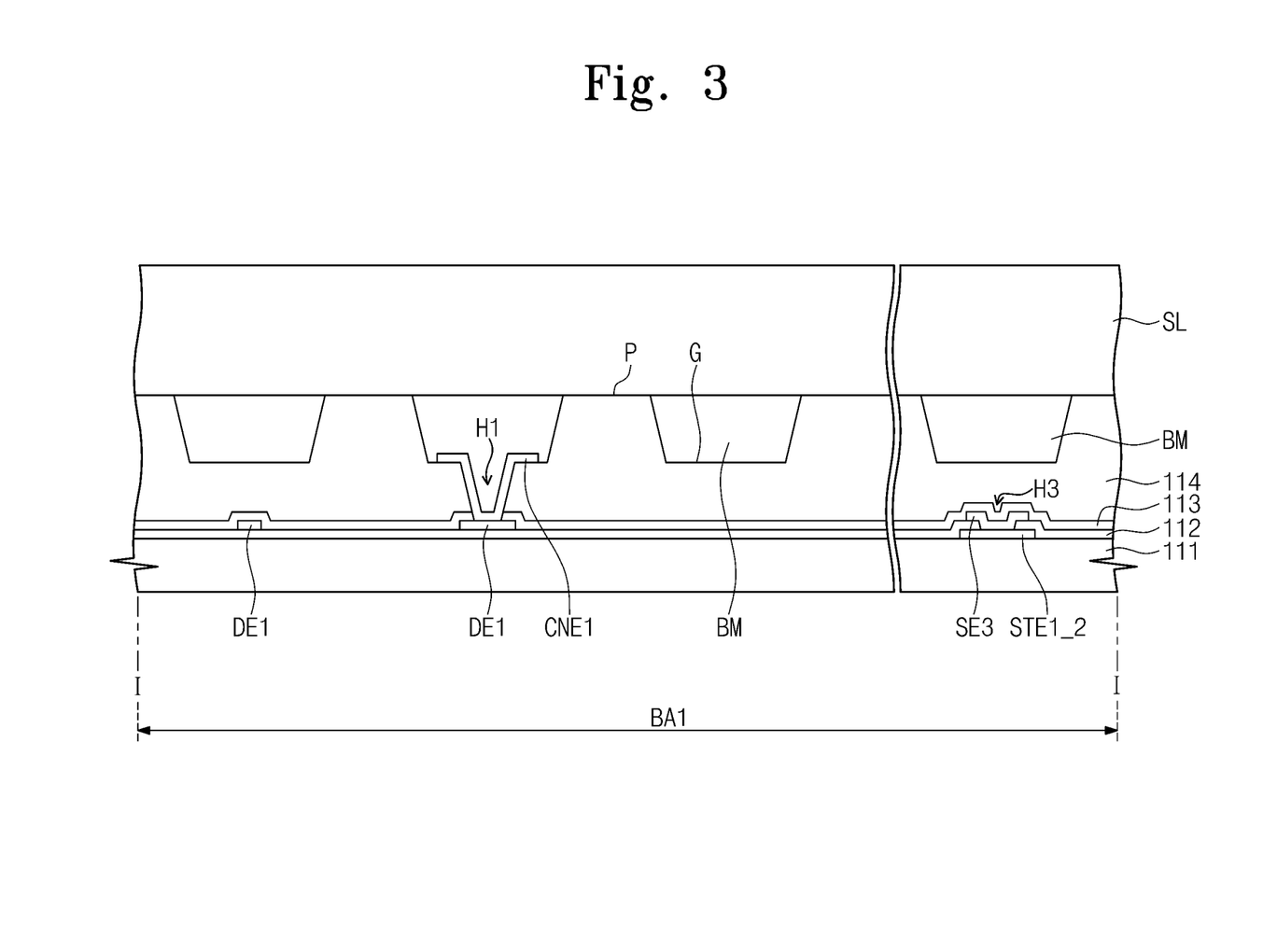
FIG. 3 is a cross-sectional view taken along line I-I' shown in FIG. 2.
Figure 4:
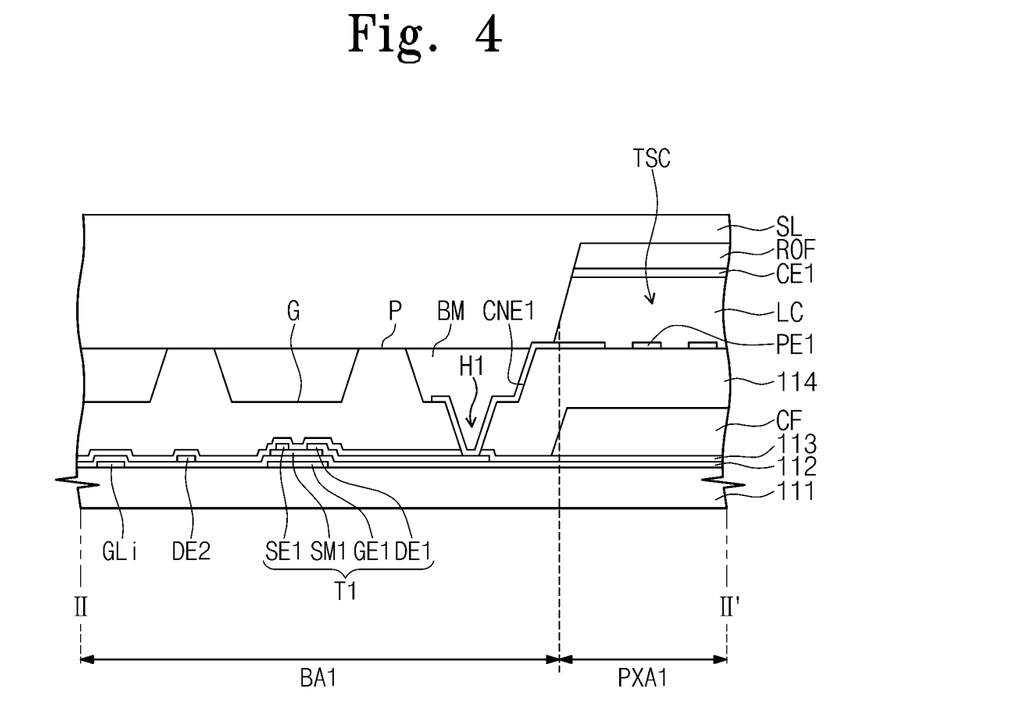
FIG. 4 is a cross-sectional view taken along line II-II' shown in FIG. 2.
Figure 5:
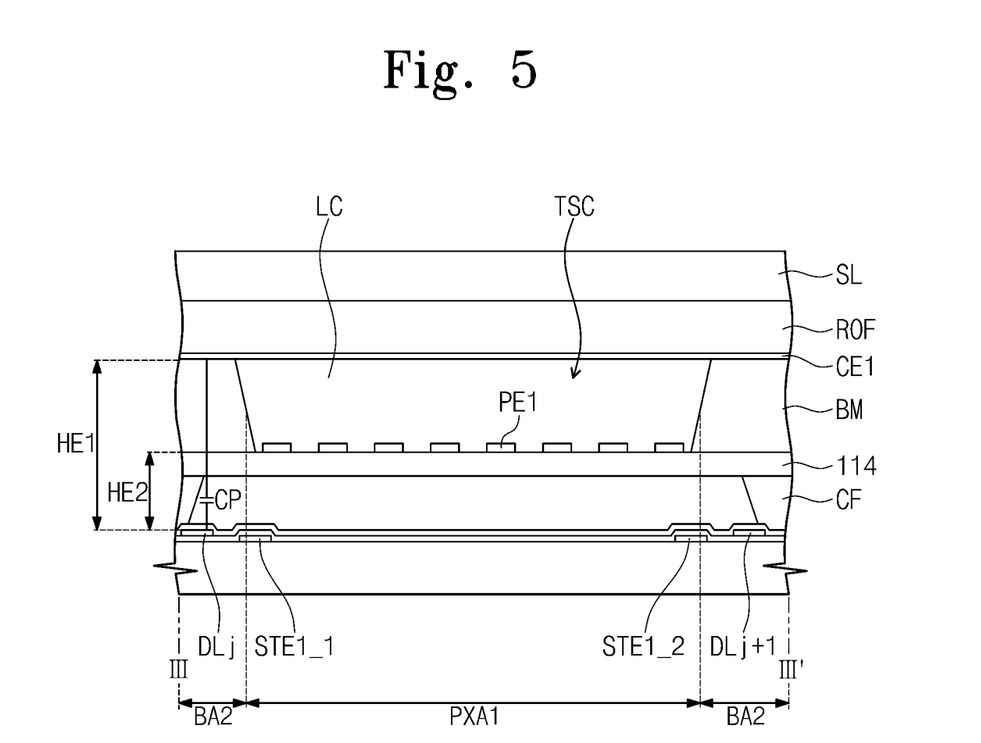
FIG. 5 is a cross-sectional view taken along line III-III' shown in FIG. 2.
Figure 6:
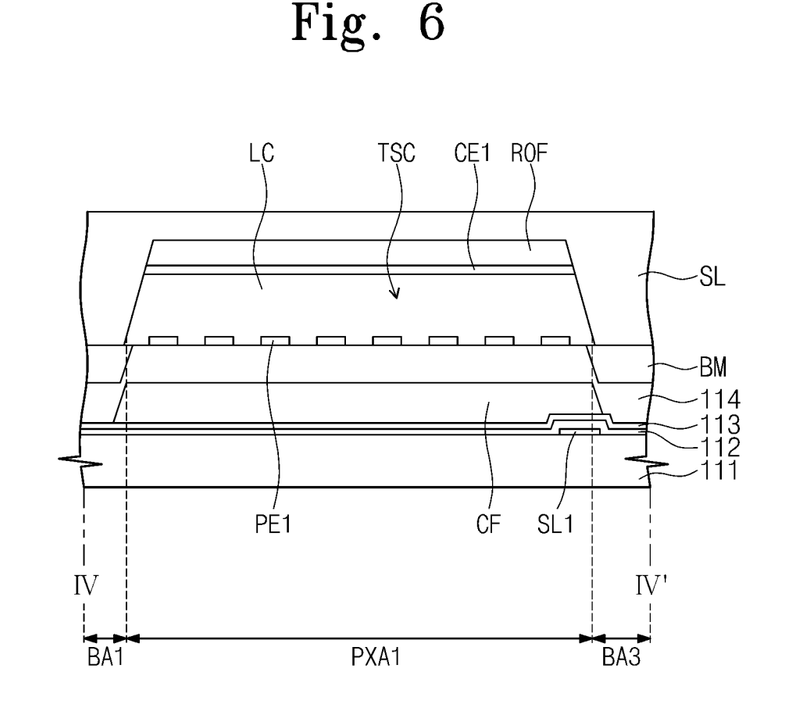
FIG. 6 is a cross-sectional view taken along line IV-IV' shown in FIG. 2.

FIG. 3 is a cross-sectional view taken along a line IT shown in FIG. 2, FIG. 4 is a cross-sectional view taken along line II-II' shown in FIG. 2, FIG. 5 is a cross-sectional view taken along line III-III' shown in FIG. 2, and FIG. 6 is a cross-sectional view taken along line IV-IV' shown in FIG. 2.

The structure of the first to third thin film transistors T1 to T3 are the same as the above-mentioned descriptions and the first to third thin film transistors T1 to T3 have the same cross-sectional stack structure. Accordingly, hereinafter, only the stack structure of the first thin film transistor T1 will be described in detail with reference to FIG. 4. In addition, left and right cross-sectional views and upper and lower cross-sectional views of the first pixel areas PXA1 of the first sub-pixel are the same as those of the second pixel area PXA2 of the second sub-pixel. Thus, the left and right cross-sectional views and upper and lower cross-sectional views of the first pixel areas PXA1 will be described with reference to FIGS. 5 and 6 below.

Referring to FIGS. 3 to 6, the display panel 100 includes a substrate 111 including the pixels PX11 to PXnm, each including the first and second pixel areas PXA1 and PXA2 to display the image. The substrate 111 is a transparent or non-transparent insulating substrate, e.g., a silicon substrate, a glass substrate, a plastic substrate, etc.

The gate line GLi is disposed on the substrate 111 to correspond to the first boundary area BA1 and is extended in the first direction D1. The first storage line SL1 is disposed on the substrate 111 to be spaced apart from the gate line GLi and extended in the first direction D1. The first and second branch electrodes STE1_1 and STE1_2 branched from the first storage line SL1 are disposed on the substrate 111 and extend in the second direction D2. As described above, the first storage line SL1 and the first and second branch electrodes STE1_1 and STE1_2 are partially overlapped with the first pixel electrode PE1.

Although not shown in figures, the second storage line SL2 and the third and fourth branch electrodes STE2_1 and STE2_2 are disposed in and/or on the same layer of the display panel 100 as the first storage line SL1 and the first and second branch electrodes STE1_1 and STE1_2. The first and second storage lines SL1 and SL2 are in and/or on a same layer as the gate line GLi.

A first insulating layer 112 is disposed on the substrate 111 to cover the gate line GLi, the first and second storage lines SL1 and SL2, and the first, second, third and fourth branch electrodes STE1_1, STE1_2, STE2_1 and STE2_2. The first insulating layer 112 includes an insulating material, e.g., silicon nitride, silicon oxide, etc. The data lines DLj and DLj+1 are extended in the second direction D2 and disposed on the first insulating layer 112. The data lines DLj and DLj+1 are disposed in the second boundary area BA2.

The first thin film transistor T1 is disposed on the substrate 111. The first thin film transistor T1 is connected to the gate line GLi and the data line DLj. The first thin film transistor T1 includes the first gate electrode GE1, the first semiconductor SM1, the first source electrode SE1 and the first drain electrode DE1.

In detail, the first gate electrode GE1 branched from the gate line GLi is disposed on the substrate 111. The first insulating layer 112 is disposed on the substrate 111 to cover the first gate electrode GE1. The first semiconductor layer SM1 is disposed on the first insulating layer 112 that covers the first gate electrode GE1 of the first thin film transistor T1. Although not shown in figures, the first semiconductor layer SM1 includes an active layer and an ohmic contact layer. The first source electrode SE1 is branched from the data line DLj and overlapped with the first semiconductor layer SM1. The first drain electrode DE1 is disposed on the first semiconductor layer SM1 to be spaced apart from the first source electrode SE1. A portion of the first semiconductor layer SM1 between the first source electrode SE1 and the first drain electrode DE1 forms a conductive channel of the first thin film transistor T1.

As described above, the third source electrode SE3 of the third thin film transistor T3 is electrically connected to the second branch electrode STE1_2 through the third contact hole H3. In detail, the third source electrode SE3 of the third thin film transistor T3 is electrically connected to the second branch electrode STE1_2 through the third contact hole H3 formed through the first insulating layer 112 as shown in FIG. 3.

A protective layer 113 is disposed to cover the data lines DLj and DLj+1 and the first thin film transistor T1. The protective layer 113 covers the upper portion of the first semiconductor layer SM1, which is exposed.

A color filter CF and a second insulating layer 114 are on the protective layer 113. The second insulating layer 114 may be, but is not limited to, an organic insulating layer. As shown in FIGS. 3 and 4, a portion of the second insulating layer 114 disposed in the first boundary area BA1 includes a plurality of protrusions P, and a plurality of recesses G respectively positioned between adjacent protrusions P. The longitudinal axes of the protrusions P and the recesses G are extended in the second direction D2. The recesses G have a height lower than a height of the protrusions P. The heights may be defined from a common reference point.

The first contact hole H1 is defined extended through a portion of the second insulating layer 114 forming a recess G of the second insulating layer 114. The first contact hole H1 overlaps the recess G of the second insulating layer 114. The first drain electrode DE1 of the first thin film transistor T1 is electrically connected to the first connection electrode CNE1 branched from the first pixel electrode PE1, through the first contact hole H1 at the recess G of the second insulating layer 114. In a method of manufacturing the display panel 100, it is more efficient that the first contact hole H1 be formed through portions of the second insulating layer 114 corresponding to the recesses G rather than through portions of the second insulating layer 114 corresponding to the protrusions P since a thickness of the second insulating layer 114 in the area corresponding to the recesses G is smaller than a thickness in the area corresponding to the protrusions P. Although not shown in figures, the second contact hole H2 is defined extended through another portion of the second insulating layer 114 forming another recess G of the second insulating layer 114.

A black matrix BM is disposed in the recesses G of the second insulating layer 114, which are in the first boundary area BA1.

The color filter CF is disposed on the protective layer 113 corresponding to the first pixel area PXA1. As shown in FIG. 5, the color filter CF of one pixel is extended into the second boundary area BA2 to be overlapped with a color filter CF of an adjacent pixel, that is, with an adjacent color filter CF. Although not shown in figures, the color filter CF is also disposed on the protective layer 113 corresponding to the second pixel area PXA2 of the second sub-pixel. The color filter CF disposed on the protective layer 113 of the second pixel area PXA2 is extended in the second boundary area BA2 to be overlapped with an adjacent color filter CF.

The color filter CF allows light passing through the pixels to have a color. The color filter CF may be a red color filter, a green color filter or a blue color filter, but is not limited thereto or thereby. The color filter CF may further include a white color filter. Among the pixels PX11 to PXnm shown in FIG. 1, different color filters CF are disposed in the pixels adjacent to each other to display different colors.

The second insulating layer 114 is disposed on the color filter CF of the first pixel area PXA1. The color filter CF and the second insulating layer 114 are overlapped with each other at a boundary between the first pixel area PXA1 and first boundary area BA1.

As described above, the area between the adjacent rows is referred to as the third boundary area BA3. The black matrix BM is disposed on the second insulating layer 114 to correspond to the third boundary area BA3 as shown in FIG. 3.

The black matrix BM is disposed on the second insulating layer 114 corresponding to the second boundary area BA2 except for the area in which the first boundary area BA1 crosses the second boundary area BA2. That is, as shown in FIG. 5, the black matrix BM is disposed on the second insulating layer 114 of the second boundary area BA2 between the first pixel areas PXA1 adjacent to each other. Although not shown in figures, the black matrix BM is also disposed on the second insulating layer 114 of the second boundary area BA2 between the second pixel areas PXA2 adjacent to each other. The black matrix BM blocks the light that is unnecessary to display the image.

The black matrix BM disposed in the second boundary area BA2 is referred to as a first black matrix, and the black matrix BM disposed in the first boundary area BA1 is referred to as a second black matrix.

A step difference formed by the black matrix BM disposed in the second boundary area BA2 may be greater than a step difference formed by the first pixel electrode PE1.

The first pixel electrode PE1 is disposed on the second insulating layer 114 in the first pixel area PXA1. The first pixel electrode PE1 has the shape as shown in FIG. 2. The first pixel electrode PE1 is partially overlapped with the first storage line SL1, and with the first and second branch electrodes STE1_1 and STE1_2 as shown in FIGS. 5 and 6.

The first common electrode CE1 is disposed on the black matrix BM in the second boundary area BA2 and on the second insulating layer 114 of the first pixel area PXA1.

The longitudinal axis of the first common electrode CE1 is extended in the first direction D1 and the first common electrode CE1 commonly corresponds to the first sub-pixels arranged in the first direction D1. The first common electrode CE1 is overlapped with the first pixel areas PXA1 arranged in the first direction D1.

The first common electrode CE1 makes contact with the black matrix BM of the second boundary area BA2. The first common electrode CE1 is spaced apart from the second insulating layer 114 in the area in which the first common electrode CE1 is overlapped with the first pixel area PXA1 to define a tunnel-shaped cavity TSC. In detail, the tunnel-shaped cavity TSC is defined by a side surface of the black matrix BM in the second boundary area BA2, the second insulating layer 114 of the first pixel area PXA1, and the first common electrode CE1.

Although not shown in figures, the tunnel-shaped cavity may be formed in the second sub-pixel in the same way as the tunnel-shaped cavity TSC formed in the first sub-pixel.

The black matrix BM of the second boundary area BA2 and the tunnel-shaped cavity TSC are overlapped with each other in the plan view at a boundary between the first pixel area PXA1 and the second boundary area BA2.

As shown in FIGS. 5 and 6, the liquid crystal layer LC is disposed in the tunnel-shaped cavity TSC. The liquid crystal layer LC includes the liquid crystal molecules (not shown). A roof layer ROF is disposed along the upper surface of the first common electrode CE1. That is, the longitudinal axis of the roof layer ROF is extended along the direction in which the first common electrode CE1 is extended and covers the upper surface of the first common electrode CE1. Thus, the roof layer ROF commonly corresponds to the first sub-pixels arranged in the extension direction, that is, the first direction D1.

Accordingly, the tunnel-shaped cavity TSC has a shape where a short axis perpendicular to the longitudinal axis is extended in the second direction D2 and both of opposing end portions in the second direction D2 of the tunnel-shaped cavity TSC are considered opened. That is, since the roof layer ROF is not at the end portion in the upper direction of the tunnel-shaped cavity TSC (e.g., towards IV' in FIG. 2 and is not at the end portion in the lower direction of the tunnel-shaped cavity TSC (e.g., toward IV in FIG. 2) in the plan view, the both opposing ends of the tunnel-shaped cavity TSC are considered opened.

The first and second common electrodes CE1 and CE2 are commonly connected to a common voltage line (not shown) disposed in the non-display area NDA. The first and second common electrodes CE1 and CE2 receive the common voltage through the common voltage line.

Although not shown in figures, an inorganic insulating layer is additionally disposed between the roof layer ROF, and the first and second common electrodes CE1 and CE2, respectively. The inorganic insulating layer may include silicon nitride or silicon oxide. The inorganic insulating layer allows the roof layer ROF to stably maintain the tunnel-shaped cavity TSC.

A sealant layer SL is disposed on the roof layer ROF. The sealant layer SL covers the substrate 111 and blocks the opened end portions of the tunnel-shaped cavity TSC so as to seal the tunnel-shaped cavity TSC. That is, the tunnel-shaped cavity TSC may be considered as defined by a side surface of the black matrix BM in the second boundary area BA2, the second insulating layer 114 of the first pixel area PXA1, the first common electrode CE1, and the sealant layer SL in the first and third boundary areas BA1 and BA3.

The first to third thin film transistors T1 to T3 are turned on in response to the gate signals provided through the gate line GLi. The data voltage provided through the data line DLj is applied to the first pixel electrode PE1 through the turned-on first thin film transistor T1. The data voltage provided through the data line DLj is applied to the second pixel electrode PE2 through the turned-on second thin film transistor T2.

The first storage line SL1 receives the storage voltage. Accordingly, the second branch electrode STE1_2 is applied with the storage voltage. The storage voltage applied to the second branch electrode STE1_2 is applied to the second pixel electrode PE2 through the turned-on third thin film transistor T3. Due to the storage voltage, the level of the data voltage applied to the second pixel electrode PE2 is lowered. This will be described in detail with reference to FIG. 7.

The first and second common electrodes CE1 and CE2 are applied with the common voltage. Due to the difference between the common voltage and the data voltage, an electric field is generated between the first common electrode CE1 and the first pixel electrode PE1 and between the second common electrode CE2 and the second pixel electrode PE2. The liquid crystal molecules are driven by the electric field generated between the first common electrode CE1 and the first pixel electrode PE1 and between the second common electrode CE2 and the second pixel electrode PE2. As a result, the amount of the light passing through the liquid crystal layer LC is changed, and thus the image is displayed. Detailed descriptions of the operation of the pixel PXij will be described in detail with reference to FIG. 7.

Referring to FIG. 5, a parasitic capacitor CP may be formed between the data line DLj of the second boundary area BA2 and the first common electrode CE1. In general, the capacitance of the parasitic capacitor is inversely proportional to the distance between two electrodes. As the capacitance of the parasitic capacitor CP becomes large, the data signal provided as the data voltage becomes delayed.

A height between the upper surface of the data line DLj and the lower surface of the first common electrode CE1 making contact with the black matrix BM of the second boundary area BA2 corresponds to a first height HE1. That is, the first common electrode CE1 is located at a position higher than the data line DLj by the first height HE1.

A height between the upper surface of the data line DLj and the upper surface of the second insulating layer 114 of the second boundary area BA2 corresponds to a second height HE2. In the case that the black matrix BM is not on the second insulating layer 114 of the second boundary area BA2, the first common electrode CE1 is downwardly extended in the second boundary area BA2 so as to make contact with the second insulating layer 114. In this case, the first common electrode CE1 is located at a position higher than the data line DLj by the second height HE2.

The first common electrode CE1 according to the illustrated exemplary embodiment makes contact with the black matrix BM on the second insulating layer 114 of the second boundary area BA2. Thus, a height difference between the first common electrode CE1 and the data line DLj corresponds to the first height HE1 which is greater than the second height HE2. As a result, the capacitance of the parasitic capacitor formed between the first common electrode CE1 and the data line DLj may be reduced. As described above, since the capacitance of the parasitic capacitor formed between the first common electrode CE1 and the data line DLj is reduced, delay of the data signal may be reduced or effectively prevented.

The liquid crystal molecules of the liquid crystal layer LC are normally arranged when the common electrode and the pixel electrode are formed to face each other. When the black matrix BM is not on the second insulating layer 114 of the second boundary area BA2, and the first common electrode CE1 is downwardly extended in the second boundary area BA2 and makes contact with the second insulating layer 114, the first common electrode CE1 forms a side surface vertical to the first pixel area PXA1. In this case, the liquid crystal molecules are abnormally arranged vertical to the first pixel area PXA1 by an electric field formed between the first pixel electrode PE1 and the first common electrode CE1.

The first common electrode CE1 according to the illustrated exemplary embodiment makes contact with the black matrix BM on the second insulating layer 114 in the second boundary area BA2. Thus, the first common electrode CE1 does not form a side surface vertical to the first pixel area PXA1, as shown in FIG. 5. Therefore, abnormal arrangement of the liquid crystal molecules may be reduced or effectively prevented.

Although not shown in figures, the second common electrode CE2 has the same configuration as that of the first common electrode CE1.

Consequently, the nanocrystal display device 500 may reduce or effectively prevent the delay of the data signal and stabilize the arrangement of the liquid crystal molecules.

Figure 7:
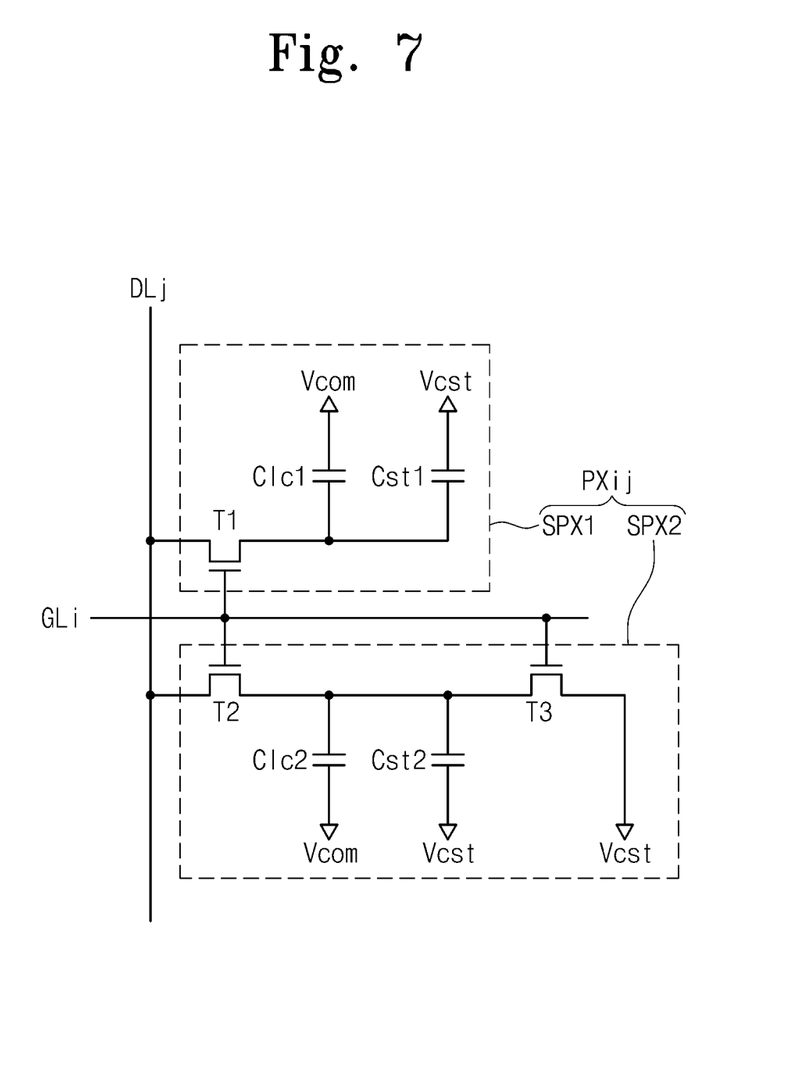
FIG. 7 is an equivalent diagram of the pixel shown in FIG. 1.

FIG. 7 is an equivalent diagram of the pixel shown in FIG. 1.

Referring to FIG. 7, the pixel PXij includes the first sub-pixel SPX1 and the second sub-pixel SPX2.

The first sub-pixel SPX1 includes the first thin film transistor T1, a first liquid crystal capacitor Clc1 and a first storage capacitor Cst1. The first thin film transistor T1 includes the first gate electrode GE1 connected to the corresponding gate line GLi, the first source electrode SE1 connected to the corresponding data line DLj, and the first drain electrode DE1 connected to the first liquid crystal capacitor Clc1 and the first storage capacitor Cst1.

As described above, the first drain electrode DE1 of the first thin film transistor T1 is connected to the first pixel electrode PE1. The first liquid crystal capacitor Clc1 is formed by the first pixel electrode PE1, the first common electrode CE1, and the liquid crystal layer LC disposed between the first pixel electrode PE1 and the first common electrode CE1. The first pixel electrode PE1 is overlapped with the first storage line SL1 and the first and second branch electrodes STE1_1 and STE1_2 to form the first storage capacitor Cst1.

The second sub-pixel SPX2 includes the second thin film transistor T2, the third thin film transistor T3, a second liquid crystal capacitor Clc2 and a second storage capacitor Cst2. The second thin film transistor T2 includes the second gate electrode GE2 connected to the corresponding gate line GLi, the second source electrode SE2 connected to the corresponding data line DLj, and the second drain electrode DE2 connected to the second liquid crystal capacitor Clc2 and the second storage capacitor Cst2.

As described above, the second drain electrode DE2 of the second thin film transistor T2 is connected to the second pixel electrode PE2. The second liquid crystal capacitor Clc2 is formed by the second pixel electrode PE2, the second common electrode CE2, and the liquid crystal layer LC disposed between the second pixel electrode PE2 and the second common electrode CE2. The second pixel electrode PE2 is overlapped with the second storage line SL2 and the third and fourth branch electrodes STE2_1 and STE2_2 to form the second storage capacitor Cst2.

The third thin film transistor T3 includes the third gate electrode GE3 connected to the corresponding gate line GLi, the third source electrode SE3 applied with the storage voltage Vcst, and the third drain electrode DE3 connected to the second pixel electrode PE2 together with the second drain electrode DE2 of the second thin film transistor T2.

As described above, the third source electrode SE3 is electrically connected to the second branch electrode STE1_2 of the first storage line SL1 to receive the storage voltage Vcst. The first and second common electrodes CE1 and CE2 receive the common voltage Vcom, and the first and second storage lines SL1 and SL2 receive the storage voltage Vcst.

The first to third thin film transistors T1 to T3 are turned on by the gate signal provided through the gate line GLi. The data voltage is applied to the first sub-pixel SPX1 through the turned-on first thin film transistor T1. In detail, the data voltage provided through the data line DLj is applied to the first pixel electrode PE1 of the first sub-pixel SPX1 through the turned-on first thin film transistor T1.

The first liquid crystal capacitor Clc1 is charged with a first pixel voltage corresponding to the data voltage. In detail, the first pixel voltage corresponding to the difference between the data voltage applied to the first pixel electrode PE1 and the common voltage Vcom applied to the first common electrode CE1 is charged in the first liquid crystal capacitor Clc1. Accordingly, the first sub-pixel SPX1 is charged with the first pixel voltage.

The data voltage is applied to the second sub-pixel SPX2 through the turned-on second thin film transistor T2 and the storage voltage Vcst is applied to the second sub-pixel SPX2 through the turned-on third thin film transistor T3.

The voltage level of the data voltage has a range wider than that of the voltage level of the storage voltage Vcst. The common voltage Vcom has the voltage level corresponding to an intermediate value of the range of the voltage level of the data voltage. An absolute value of the difference between the data voltage and the common voltage Vcom may be greater than an absolute value of the difference between the storage voltage Vcst and the common voltage Vcom.

A junction voltage between the second thin film transistor T2 and the third thin film transistor T3 corresponds to a voltage divided by a resistance value when the second and third thin film transistors T2 and T3 are turned on. That is, the junction voltage between the second thin film transistor T2 and the third thin film transistor T3 has a voltage value corresponding to an intermediate value between the data voltage provided through the turned-on second thin film transistor T2 and the storage voltage Vcst provided through the turned on third thin film transistor T3. The junction voltage between the second thin film transistor T2 and the third thin film transistor T3 is applied to the second pixel electrode PE2. In other words, a voltage corresponding to the intermediate value between the data voltage and the storage voltage Vcst is applied to the second pixel electrode PE2.

A second pixel voltage, corresponding to a difference between the voltage applied to the second pixel electrode PE2 and the common voltage Vcom applied to the second common electrode CE2, is charged in the second liquid crystal capacitor Clc2. That is, the second liquid crystal capacitor Clc2 is charged with the second pixel voltage smaller than the first pixel voltage. Accordingly, the second sub-pixel SPX2 is charged with the second pixel voltage smaller than the first pixel voltage.

Due to the above-mentioned operation, a viewer perceives the gray scale corresponding to the intermediate value between the first pixel voltage and the second pixel voltage, which are charged in the pixel PXij.

Figure 8:
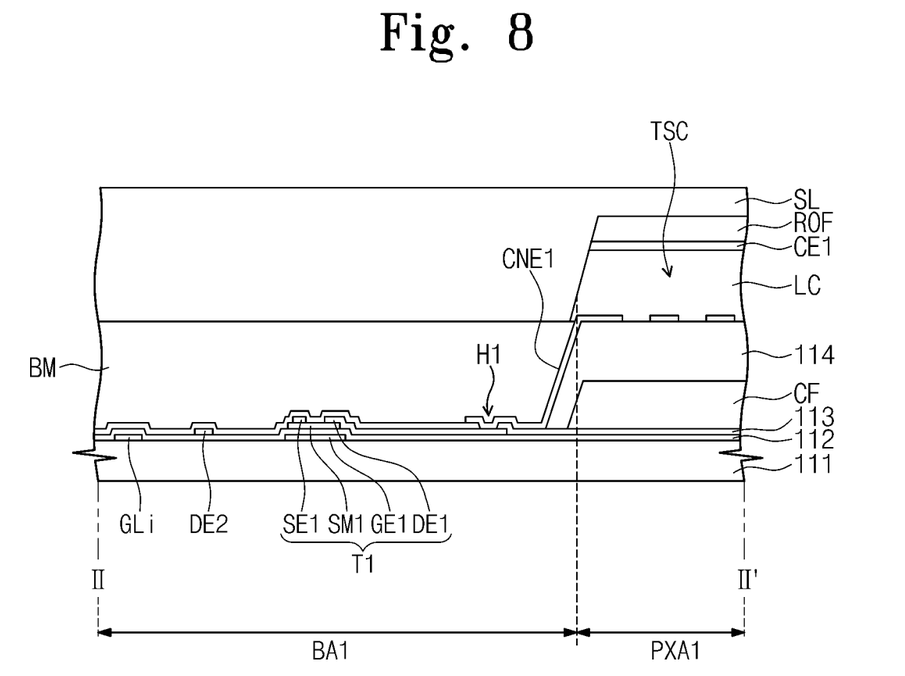
FIG. 8 is a cross-sectional view showing another exemplary embodiment of a nanocrystal display according to the invention, taken along line II-II' shown in FIG. 2.

FIG. 8 is a cross-sectional view showing another exemplary embodiment of a nanocrystal display device according to the invention, taken along line II-II' shown in FIG. 2.

The nanocrystal display device in FIG. 8 has the same configuration and function as those of the nanocrystal display device 500 according to the exemplary embodiment except for a cross-sectional configuration of a first boundary area BA1. In addition, the cross-sectional configuration of the first boundary area BA1 is the same as that of the first boundary area BA1 shown in FIG. 4 except for the configuration of the black matrix BM and the second insulating layer 114.

Referring to FIG. 8, a first drain electrode DE1 of a first thin film transistor T1 is electrically connected to a first connection electrode CNE1 branched from a first pixel electrode PE1 through a first contact hole H1 defined in a protective layer 113. The second insulating layer 114 does not overlap the first drain electrode DE1 in the first boundary area BA1. Since the first contact hole H1 is defined extended through only the protective layer 113, the first contact hole H1 has a size smaller than that of the first contact hole H1 shown in FIG. 4. That is, a depth or height of the first contact hole H1 in the cross-sectional direction of the first contact hole H1 in FIG. 8 is smaller than that of the first contact hole H1 in FIG. 4, since the first contact hole H1 in FIG. 8 does not have to extend through a thickness of the second insulating layer 114.

A second insulating layer 114 is considered opened in the first boundary area BA1. That is, as shown in FIG. 8, the second insulating layer 114 is not disposed in the first boundary area BA1. Instead, a black matrix BM is disposed to cover the first thin film transistor T1 in the first boundary area BA1.

The second insulating layer 114 and the black matrix BM in the first boundary area BA1 are overlapped with each other at a boundary between the first pixel area PXA1 and the first boundary area BA1. The first connection electrode CNE1 makes contact with a side surface of the second insulating layer 114 at the boundary between the first pixel area PXA1 and the first boundary area BA1. The other configurations of the nanocrystal display device in FIG. 8 are the same as those of the nanocrystal display device 500 of the previous exemplary embodiment.

Consequently, the nanocrystal display device in FIG. 8 may also reduce or effectively prevent the delay of the data signal and stabilize the arrangement of the liquid crystal molecules as described above.

Although exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A nanocrystal display device comprising:
a substrate comprising a plurality of pixels which displays an image;
a gate line on the substrate and extended in a pixel row direction;
a first insulating layer on the gate line;
a data line on the first insulating layer, extended in a pixel column direction and crossing the gate line;
a second insulating layer on the data line;
a first boundary area extended in the pixel row direction, between adjacent first and second pixel areas; and
a second boundary area extended in the pixel column direction, between adjacent first pixel areas and between adjacent second pixel areas,
wherein each pixel comprises:
a first pixel area and a second pixel area adjacent to each other in the pixel column direction;
a first sub-pixel comprising a first pixel electrode on the second insulating layer of the first pixel area;
a second sub-pixel comprising a second pixel electrode on the second insulating layer of the second pixel area;
a common electrode extended in the pixel row direction and spaced apart from the second insulating layer in the first and second pixel areas, a first black matrix on the second insulating layer to be disposed between the data line and the common electrode and contacting the common electrode, and forming a step difference greater than a step difference of the first and second pixel electrodes;
a tunnel-shaped cavity between the common electrode, the first black matrix and the second insulating layer; and
a liquid crystal layer in the tunnel-shaped cavity,
wherein the first black matrix is on the second insulating layer in the second boundary area to be disposed between the data line and the common electrode, except for an area in which the first boundary area crosses the second boundary area.

2. The nanocrystal display device of claim 1, further comprising:
first and second storage lines extended in the pixel row direction, and in a same layer as the gate line,
wherein the each pixel is connected to the gate line and the data line.

3. The nanocrystal display device of claim 2, wherein
the first sub-pixel further comprises a first thin film transistor connected to the gate line, the data line and the first pixel electrode,
the second sub-pixel further comprises a second thin film transistor connected to the gate line, the data line and the second pixel electrode, and a third thin film transistor connected to the gate line and the second pixel electrode, and
the first, second and third thin film transistors are in the first boundary area.

4. The nanocrystal display device of claim 3, wherein the second insulating layer is in the first boundary area and covers the first, second and third thin film transistors.

5. The nanocrystal display device of claim 4, wherein the second insulating layer in the first boundary area comprises:
a plurality of protrusions having a first thickness, and
a plurality of recesses each defined between the adjacent protrusions, at which the second insulating layer has a second thickness smaller than the first thickness,
the plurality of protrusions and recesses extended in the pixel column direction.

6. The nanocrystal display device of claim 5, further comprising:
a first contact hole defined in the second thickness of the second insulating layer at a first recess; and
a second contact hole defined in the second thickness of the second insulating layer at a second recess different than the first recess.

7. The nanocrystal display device of claim 6, wherein the first thin film transistor comprises a first source electrode branched from the data line, a first gate electrode branched from the gate line, and a first drain electrode connected to the first pixel electrode through the first contact hole.

8. The nanocrystal display device of claim 6, wherein the second thin film transistor comprises a second source electrode branched from the data line, a second gate electrode branched from the gate line, and a second drain electrode connected to the second pixel electrode through the second contact hole.

9. The nanocrystal display device of claim 5, further comprising a second black matrix in the plurality of recesses in the first boundary area.

10. The nanocrystal display device of claim 3, further comprising:
- first and second branch electrodes branched from the first storage line, extended in the pixel column direction and spaced apart from each other in the pixel row direction; and
- third and fourth branch electrodes branched from the second storage line, extended in the pixel column direction and spaced apart from each other in the pixel row direction.

11. The nanocrystal display device of claim 10, wherein the third thin film transistor comprises a third gate electrode branched from the gate line, a third drain electrode connected to the second pixel electrode, and a third source electrode connected to one of the first and second branch electrodes.

12. The nanocrystal display device of claim 10, wherein
- the first pixel electrode partially overlaps the first storage line and the first and second branch electrodes, and
- the second pixel electrode partially overlaps the second storage line and the third and fourth branch electrodes.

13. The nanocrystal display device of claim 3, wherein the second insulating layer is disposed non-overlapping the first, second, and third thin film transistors in the first boundary area,
further comprising:
- a protective layer on the first, second, and third thin film transistors in the first boundary area, and overlapping the second insulating layer in the first and second pixel areas;
- a first contact hole defined in the protective layer; and
- a second contact hole defined in the protective layer.

14. The nanocrystal display device of claim 13, wherein the first thin film transistor is connected to the first pixel electrode through the first contact hole and the second thin film transistor is connected to the second pixel electrode through the second contact hole.

15. The nanocrystal display device of claim 14, wherein
- the first black matrix contacts the protective layer in the first boundary area, and
- an end of the second insulating layer overlaps an end of the first black matrix in the first boundary area.

16. The nanocrystal display device of claim 1, wherein each of the first and second pixel electrodes comprises:
- a plurality of branches extended from an outer portion of the first and second pixel electrodes;
- an open area having a cross shape defined by distal ends of the plurality of branches extended from the outer portion of the first and second pixel electrodes, wherein the open area divides the first and second pixel areas into a plurality of domains; and
- a plurality of slits defined between the branches,
- wherein the branches are substantially parallel to each other in each domain, and are extended in different directions in different domains.

17. The nanocrystal display device of claim 1, further comprising:
- a roof layer on the common electrode and extended in the pixel row direction; and
- a sealant on the roof layer,
- wherein the tunnel-shaped cavity is between the common electrode, the first black matrix, the second insulating layer and the sealant.

18. The nanocrystal display device of claim 1, further comprising a plurality of color filters in the first and second pixel areas, respectively,
wherein
- the second insulating layer is on the color filters, and
- each of the color filters is extended in the pixel column direction and overlaps an adjacent color filter in the pixel row direction.

* * * * *